United States Patent
Glod et al.

(10) Patent No.: US 10,075,586 B2
(45) Date of Patent: Sep. 11, 2018

(54) PROVISION OF CALLER INFORMATION

(71) Applicant: TELIASONERA AB, Stockholm (SE)

(72) Inventors: Thomas Glod, Stockholm (SE); Juho Seppanen, Helsinki (FI)

(73) Assignee: TELIA COMPANY AB, Solna (SE)

( * ) Notice: Subject to any disclaimer, the term of this patent is extended or adjusted under 35 U.S.C. 154(b) by 0 days.

(21) Appl. No.: 15/524,110

(22) PCT Filed: Oct. 9, 2015

(86) PCT No.: PCT/EP2015/073337
§ 371 (c)(1),
(2) Date: May 3, 2017

(87) PCT Pub. No.: WO2016/071073
PCT Pub. Date: May 12, 2016

(65) Prior Publication Data
US 2017/0331950 A1    Nov. 16, 2017

(30) Foreign Application Priority Data
Nov. 3, 2014   (FI) ...................................... 20145958

(51) Int. Cl.
*H04M 3/42*   (2006.01)
*G06F 17/30*  (2006.01)

(52) U.S. Cl.
CPC .. *H04M 3/42042* (2013.01); *G06F 17/30035* (2013.01); *H04M 3/4211* (2013.01)

(58) Field of Classification Search
CPC ......... H04M 3/42017; H04M 3/42042; H04M 3/42059; H04M 3/436; H04M 2207/18; H04M 3/42195; H04M 3/42068; H04M 1/57; H04M 1/576; H04M 3/4211; H04M 2203/651; H04M 3/02; H04M 3/42102; H04M 15/83
See application file for complete search history.

(56) References Cited

U.S. PATENT DOCUMENTS

2003/0032414 A1* 2/2003 Melaku ................. H04M 1/576
455/415
2006/0073817 A1   4/2006 Lee
(Continued)

FOREIGN PATENT DOCUMENTS

CN   101 820 603 A    9/2010
EP   1 672 893 A1     6/2006

OTHER PUBLICATIONS

International Search Report, dated Jan. 26, 2016, from corresponding PCT application.
(Continued)

*Primary Examiner* — Kwasi Karikari
(74) *Attorney, Agent, or Firm* — Young & Thompson (57) ABSTRACT

Disclosed is a method for providing information relating to a subscriber A in a call connection establishment initiated by the subscriber A to a subscriber B. The method includes the steps of: receiving a call connection in a connection control unit; initiating a query to a server; obtaining information relating to the subscriber A from a database; and providing the obtained information relating to the subscriber A to the subscriber B. Also disclosed is a system and a server implementing at least some steps of the method.

18 Claims, 5 Drawing Sheets

(56) References Cited

U.S. PATENT DOCUMENTS

| | | |
|---|---|---|
| 2007/0211873 A1 | 9/2007 | Wang |
| 2009/0129578 A1 | 5/2009 | Zhou |
| 2009/0257575 A1 | 10/2009 | Gosselin et al. |
| 2010/0041379 A1* | 2/2010 | Yu .......................... H04W 4/16 455/414.1 |

OTHER PUBLICATIONS

FI Search Report, dated Jun. 8, 2015, from corresponding FI application.

* cited by examiner

PROVISION OF CALLER INFORMATION

TECHNICAL FIELD

The invention concerns in general the technical field of telecommunications. Especially the invention concerns connection attempts between subscribers in a telecommunication network.

BACKGROUND

When a callee (subscriber B) receives a call from a caller (subscriber A) it is advantageous if the callee receives information on the caller for example in order to decide if he/she accepts the call. In mobile communication this kind of situation is traditionally achieved by utilizing the phone book in the user equipment. The user pre-stores contact details, such as MSISDN number with names, in a memory of the user device or subscriber identity module, and when the user i.e. the callee receives the call from a subscriber A, the user equipment is configured to retrieve caller details from the phone book on a basis of MSISDN number delivered in the call and as a result the callee (subscriber B) may see on the display of the user equipment the caller name. This works fine as long as the callee has pre-stored the information on the caller in the memory. However, when the caller is unknown to the callee the phone book based solution does not work.

Another known solution to achieve the same outcome is such that when the subscriber B receives the call the user equipment is configured to initiate a query towards a network element in order to retrieve information, such as a name, of a subscriber A. This kind of arrangement, at least in principle, solves the above described problem and by means of the arrangement it is also possible to provide information on unknown callers to the callee. However, the problem is that the arrangement requires that an application is installed in the user equipment, which is configured to perform the query to the network node. The challenge may also be when the network coverage is limited during the incoming call. Then it may happen that the retrieval of information on subscriber A takes too long while the call is already ringing and as a result the desired information cannot be provided to the callee. Further challenge with the existing solutions is that the user equipment restricts giving the MSISDN of the caller to the installed application, thus the application not being able to identify the caller MSISDN to perform a query on the network node, e.g. to retrieve the caller name.

Thus, there is need to develop improved solutions in order to provide information on the caller to callee in due course during the call.

SUMMARY

An objective of the invention is to present a method, a system and a server for providing information relating to a subscriber in the network. Another objective of the invention is that the method, the system and the server for providing information operate in a context of a call connection establishment The objectives of the invention are reached by a method, a system and a server as defined by the respective independent claims.

According to a first aspect, a method for providing information relating to a subscriber A in a call connection establishment initiated by the subscriber A to a subscriber B is provided, wherein the method comprising: receiving a call connection in a connection control unit; initiating, by the connection control unit, a query to a server, the query comprising identity information on the subscriber A and the subscriber B; obtaining information, by the server, relating to the subscriber A from a database; and providing, by the server, the obtained information relating to the subscriber A to the subscriber B.

The method may further comprise a step of acknowledging the connection control unit on at least one of the following: receipt of query in the server, obtainment of information from the database. Furthermore, the method may comprise a step of initiating the call connection, by the connection control unit, to subscriber B in response to the acknowledgement by the server.

The method may further comprise a step of waiting, by the server, for an indication on a state of the call connection from the connection control unit, wherein the provision of the obtained information relating to the subscriber A is initiated if the indicated state of the call connection matches with a predefined state. The indication may be established in response to a receipt of information from the subscriber B by the connection control unit. The predefined state may be a ringing state.

The method may further comprise a step of canceling the provision of the obtained information if the state of the call connection deviates from the predefined state.

Furthermore, in the method the provision of the obtained information relating to the subscriber A to the subscriber B by the server may be performed either directly or indirectly through another server.

According to a second aspect, a system for providing information relating to a subscriber A in a call connection establishment initiated by the subscriber A to a subscriber B is provided, wherein the system comprises a connection control unit configured to control the call connection establishment and a server configured to obtain the information on the subscriber B in response to a query from the connection control unit and configured to deliver the obtained information to the subscriber B.

The system may further comprise a database maintaining the information on the subscriber A.

The obtainment of information relating to the subscriber A may be based on identity information of subscriber A and subscriber B, wherein the identity information is carried in the system.

The connection control unit in the system may be at least one of the following: mobile switching center, intelligent network, IP multimedia subsystem.

The system may further comprise an external server through which the server may be configured to deliver the obtained information to the subscriber B.

According to a third aspect, a server for providing information relating to a subscriber A in a call connection establishment initiated by the subscriber A to a subscriber B is provided, wherein the server comprises at least one processor and at least one memory storing at least one portion of computer program code, and wherein the processor being configured to cause the server at least to perform: receive a query from a connection control unit, the query comprising identity information on the subscriber A and the subscriber B; obtaining information relating to the subscriber A from a database; providing the obtained information relating to the subscriber A to the subscriber B.

The server may further be configured to acknowledge the connection control unit on at least one of the following: receipt of query, obtainment of information from the database.

The server may further be configured to wait for an indication on a state of the call connection from the connection control unit, wherein the provision of the obtained information relating to the subscriber A is initiated if the indicated state of the call connection matches with a predefined state.

The server may further be configured to cancel the provision of the obtained information if the indicated state of the call connection deviates from the predefined state.

Furthermore, the server may be configured to deliver the obtained information relating to the subscriber A to the subscriber B through an external server.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

In the following the present invention is described. In the description a caller is referred with a term subscriber A and a callee is referred with subscriber B, both equipped with user equipment. The subscriber is defined in the network by a predetermined data entity identifying the subscriber in the network and to whom the network may provide the network services in use. Both the caller and the callee use any equipment by means of which it is possible to utilize the network services, such as establishing a connection through a mobile communication network. In order to have an access to the mobile communication network the user equipment (UE) are equipped with a subscriber identity module (SIM) storing the subscriber identity and authentication related information to be utilized in the communication through the mobile communication network. The subscriber identity module may be provided physically with UICC (Universal Integrated Circuit Card) in the user equipment or at least partly with a software solution implemented in the user equipment.

Figure 1:
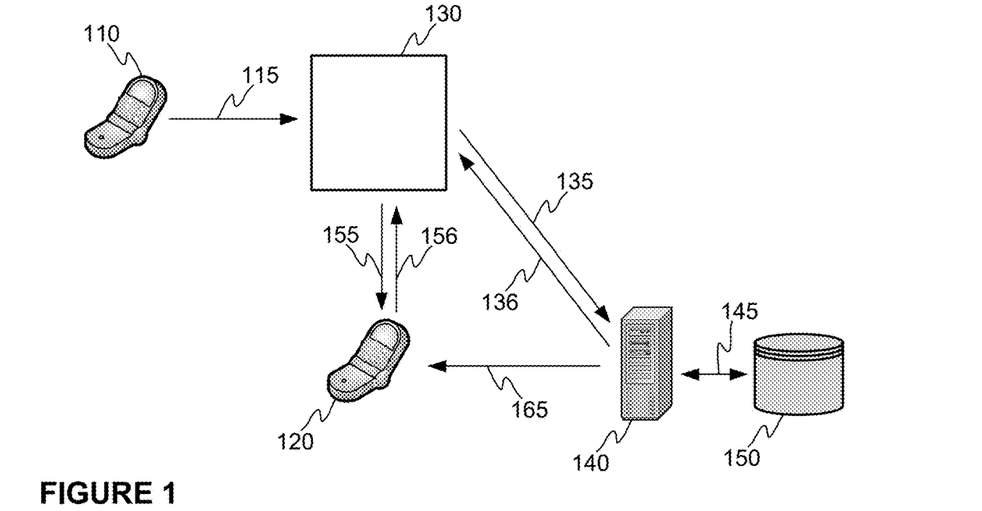
FIG. 1 illustrates schematically some aspects of an example of the invention.

Some aspects relating to the present invention is now described by referring to the FIG. 1. FIG. 1 illustrates schematically an environment of the invention wherein the relevant entities from the invention point of view are depicted. Subscriber A 110 reaches subscriber B 120 by initiating a call connection 115 through a connection control unit 130. The connection control unit 130 is configured to perform typical operations relating to call setup, such as querying information on the subscriber B from a register in order to route the call in a correct way. The connection control unit may be configured to check, e.g. in response to a receipt of call connection 115, if the subscriber B 120 has activated a service according to the invention as will be described. Alternatively or in addition, the connection control unit 130 may be configured to check, e.g. from a data storage, information relating to the subscriber software installed in the user equipment of the subscriber B. Further, the connection control unit is configured to initiate a query 135, either directly or indirectly, to a network node called as a server 140 from now on. The query 135 instructs the server to provide additional information on the subscriber A. The query 135 comprises at least identity information carried in the call connection 115 on both the subscriber A 110 and the subscriber B 120. The identity information may e.g. be, but is not limited to, MSISDN (Mobile Station International Subscriber Directory Number), which is an identity uniquely identifying a subscription in a mobile communication network (such as GSM or a UMTS mobile network). Moreover, the query 135 may also carry information with respect to software installation in the user equipment of the subscriber B. The server 140 is configured to determine the identity information of the subscriber A 110 from the query 135 and to initiate a database query 145 at least with the identity information of the subscriber A 110 towards database 150 storing predetermined additional information relating to at least some of the subscribers. The database 150 may be an external entity to the server 140, as depicted in FIG. 1, or it may internal part of the server 140. In response to the database query 145 the server 140 receives the additional information relating to the subscriber A 110 stored in the database 150. The server 140 now comprises the additional information on the subscriber A 110.

The server 140 is also configured to deliver an acknowledgement 136 to the connection control unit 130. The acknowledgement 136 may be delivered either immediately in response to the query 135 to indicate that the server 140 has received the query 135 or alternatively it may be delivered in response to a receipt of the additional data from the database 150 (database query 145).

Next the delivery of the additional information on the subscriber A 110 to the subscriber B 120 is described. According to an embodiment of the present invention the server 140 is configured to deliver 165 the additional information on the subscriber A 110 to the subscriber B 120 in response to a receipt of it from the database 150. The call connection 155 may be initiated at some point e.g. in response to receipt of the acknowledgement 136 in the connection control unit 130.

Alternatively, the delivery 165 of the additional information on the subscriber A to the subscriber B may be arranged to be dependent on a predefined state of a call connection. For example, as the connection control unit 130 receives the acknowledgement 136 from the server 140 as described above, the connection control unit 130 receives an indication that it may continue the call connection establishment. Then the connection control unit 130 may be configured to deliver the call connection 155 to the subscriber B 120. The subscriber B gives a response indicating a ringing state 156 i.e. a predefined state to the connection control unit 130. As the connection control unit 130 receives the indication on the ringing state 156 the connection control unit may trigger the delivery of the additional information to the subscriber B 120 by indicating the predefined state to the server 140 (the trigger is not shown in FIG. 1). In this way, the server 140 is able (if configured to do so) to wait sending the additional information on the subscriber A 165 until the subscriber B 120 has the incoming call ringing (thus preventing the additional information 165 to be received before call connection 155 at the subscriber B 120).

Furthermore, the delivery of additional information to the subscriber B from the server 140 may also be initiated in response to a request received in the server 140 from subscriber B. This may be arranged, for example, so that when the subscriber B detects the incoming call, e.g. by detecting the call connection 155 it is configured to initiate the request towards the server 140 in order to receive the additional information on the caller. Hence, the delivery of additional information 165 is at least partly dependent on the request by the subscriber B towards the server 140 in such an implementation.

If the server has received information relating to the software installation in the user terminal of the subscriber B, the server 140 may take this into account in a preparation and/or delivery of the additional information to the subscriber B 120. In such a case the information on the software installation comprises, but is not limited to, an indication on the software application by means of which the additional information is to be shown in the user equipment of the subscriber B.

In some further implementation the connection control unit 130 may be configured to acknowledge the server 140 of the end of ringing state i.e. the subscriber B has answered the call, and the server 140 may be configured to cancel the delivery of the additional information 165 if it is not already sent when the acknowledgement of the end of the ringing state is received in the server 140. This enables preventing the delivery of additional information 165 too late if the additional information is time dependent.

In some further embodiment it may be defined a period of time for the server 140 during which it shall deliver the additional information 165 to the subscriber B after e.g. the receipt of query 135 from the connection control unit 130. This also provides an enhanced solution to deliver the additional information optimally to the subscriber B.

The delivery of the additional information 165 may be performed through any communication channel, such as through IP connection if the subscriber B 120 has an IP based data connection enabled in the terminal or through a communication channel over a mobile communication network, such as a short message (SMS). Depending on the implementation the subscriber B may be configured to deliver an acknowledgement to the server on the receipt of the additional information.

Herein it is discussed that the server 140 is configured to obtain and deliver additional information relating to the subscriber A in the call connection context. The additional information refers to any information on subscriber A, which is stored and is obtainable from a database or any other storage. Some non-limiting examples on the additional information may e.g. be name of the subscriber A, status of the subscriber A, location of the subscriber A, address of the subscriber A, company of the subscriber A and so on. As discussed the storage and retrieval of the additional information may be implemented by utilizing the identity information on the subscriber A, such as MSISDN number.

The real implementation of the invention in the schematic environment as illustrated in FIG. 1 is dependent on the network technology in use. In case of GSM/CDMA based network technology the connection control unit 130 may be a Mobile Switching Center MSC operating together with e.g. an intelligent network and/or IP multimedia subsystem and performing tasks as defined in a corresponding telecommunication standard. As the tasks of the MSC are standardized initiation of the query 135 shall be done indirectly towards the server 140. This refers to an implementation wherein an intelligent network is utilized between the MSC and the server 140. The intelligent network is communicatively coupled to MSC (i.e. may be integrated to the MSC or be separate to that) and it provides a tool for MSC to initiate a query to the server 140 by utilizing standardized signaling (or possibly proprietary signaling depending on mutual support between the control unit 130 and IN) towards the intelligent network. The intelligent network is configured to establish the query to the server by utilizing at least the identity information of the subscriber A.

There are defined some so called detection points during the call setup in the MSC at which it is possible to initiate operation in the intelligent network. In such detection point the MSC initiates an intelligent network (IN) query to so called service control point (SCP) in the IN. In such a case the MSC may be considered acting as a Service Switching Point (SSF or gsmSSF). The SCP is configured to invoke an application based on the received information from SSF. According to the present invention the subscriber numbers A and B are parameters in the IN query. The invoked application by the SCP is arranged to check if the subscriber B has the service according to the present invention activated from a service data function (SDF), which is a database storing subscriber related data (e.g. service data). If a positive response is received from the SDF, the application is configured to respond to the SSF/gsmSSF, i.e. MSC in some embodiment of the arrangement, based on application logic and received information from the SDF. In the response a query is setup to the server 140 with the identity information as a parameter. As a result, the procedure according to the invention continues as described. As a further note the SDF function may be considered to co-locate with SCP (i.e. being a node in the intelligent network or external to that). Furthermore, the SCP may, at least in some implementations, be considered as a network element hosting services or applications.

Figure 2:
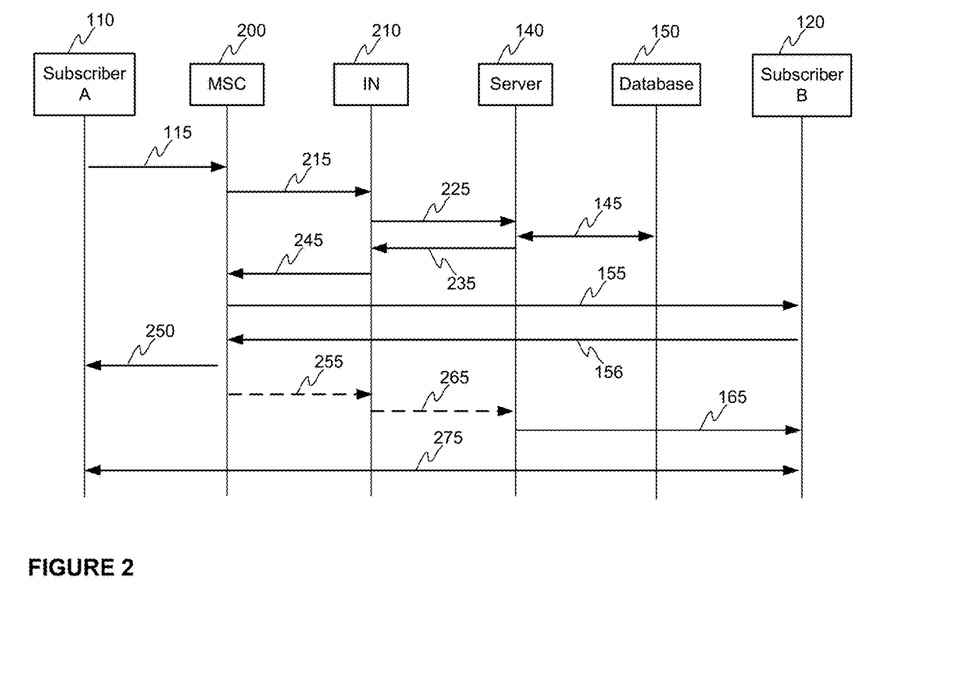
FIG. 2 illustrates schematically signaling between elements in an embodiment of the invention.

FIG. 2 illustrates a signaling in a case where the connection control unit 130 comprises at least functionalities of MSC 200 and an intelligent network 210. The call connection is to be established over a circuit switched connection. The provision of additional information may be performed as follows:

a) Subscriber A 110 initiates the call connection 115 towards MSC 200.

b) MSC 200 performs a predetermined operation with an intelligent network 210 (at predetermined detection points defined in the MSC), which causes that the intelligent network to define if the service according to the invention shall be implemented for the subscriber B. Intelligent network receives the identity information (i.e. MSISDN) on both subscriber A and subscriber B.

The intelligent network may also determine information on software application used in the user equipment of the subscriber B in the context of the service according to the present invention if such information is accessible by the intelligent network.

c) Intelligent network initiates a query 225 towards a server 140 with MSISDN information on subscriber A and subscriber B if the service is activated for the subscriber B. The query instructs the server to acquire additional information on the subscriber A.

d) The server obtains, or at least initiates an obtainment of, the additional information from a database 150 with a database query 145.

e) The server 140 acknowledges 235 to the intelligent network 210 that the additional information is obtained or the process is at least initiated.

f) The intelligent network 210 acknowledges 245 the previous step to MSC. The acknowledgement 245 is not necessarily tied with step 235, since it may also be a direct acknowledgement to MSC 200 to instruct to continue the call setup without waiting database query 145 and acknowledgement 235 to complete.

g) The MSC routes the call connection 155 to subscriber B.

h) Subscriber B indicates a ringing state 156 in the call connection to MSC. The ringing state may also be indicated to subscriber A 250.

i) Steps 255 and 265 in FIG. 2 are optional and refer to a procedure in which the MSC informs the server 140 on the ringing state through the intelligent network 210.

j) The server 140 is configured to deliver the additional information 165 to subscriber B 120. Depending on the implementation this may happen directly in response to receipt of information from the database 150 or in response of receipt of information on the ringing state (step i).

k) In step 275 the call connection is setup between the subscriber A and the subscriber B if the call connection is accepted by subscriber B.

The present invention is also applicable in a context of IP based voice calls. Voice over IP (VoIP) refers to an implementation wherein IP based application layer is build up on some access technology in order to deliver the communication data in packets between the entities. An example of VoIP implementation is so called IP multimedia subsystem (IMS), which is an architectural framework for delivering IP multimedia services. More specifically, the IMS is a concept for an integrated network of telecommunications carriers that would facilitate the use of IP for packet communications in all known forms over wireless or landline. Examples of such communications include traditional telephony, fax, e-mail, Internet access, Web services, Voice over IP (VoIP), instant messaging (IM), videoconference sessions and video on demand (VoD). In IMS solutions a horizontal control layer is implemented between the access network, such as 3G, and the service layer so that IP based service may be provided.

Figure 3:
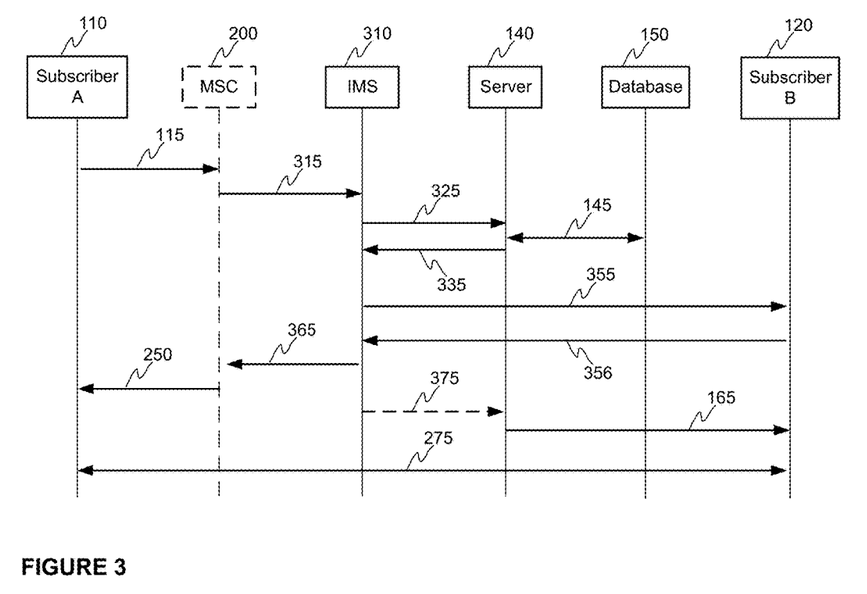
FIG. 3 illustrates schematically signaling between elements in another embodiment of the invention.

FIG. 3 illustrates an example of applying the present invention within the IMS implementation wherein the connection control unit comprises at least functionalities of MSC 200 and IMS 310 comprising essentially at least functionalities of so called CSCF (Call Session Control Function) logic element). The provision of additional information in IMS context may be performed as follows:

a) Subscriber A 110 initiates the call connection 115 towards MSC (circuit switched call). Please note that the MSC 200 is illustrated with a dashed line in FIG. 3 in order to indicate that it is not necessary component, or not at least involved in the call connection, if the subscriber A 110 has a data connection over packet switched IMS.

b) The MSC forwards the call connection request 315 to an IMS 310, which takes the control of the call and the implementation of the present invention there. A decision on the forwarding the call connection to the IMS is made on the basis of retrieval of location information of the subscriber B from a location register, such as HSS or HLR, storing information on the subscriber B location. The IMS 310 may also check if the service according to the present invention is activated for the subscriber B. Additionally, the IMS may determine information on software application used in the user equipment of the subscriber B in the context of the service according to the present invention.

c) The IMS initiates a query by routing the call signaling (using e.g. co called Initial Filter Criteria iFC logic defined in IMS specifications) 325 towards the server 140, wherein the query comprises identity information, such as MSISDN numbers, of the subscriber A and the subscriber B. This iFC trigger point is analogous to MSC decision points, and if wanted, the iFC could point to IN (the MSC case in circuit switched call connection as described above) if wanting to use same IN logic to reach the server 140 and if the IMS is connected to IN/SDE system. The SDE (Service Deliver Environment) refers to a SIP (Session Initiation Protocol) capable platform supporting intelligent network functions and may act as an IMS Application server to handle triggers from both MSC and IMS for call control. (Note: In case of pure intelligent network solution (i.e. without SIP/IMS implementation) the SDE may be considered acting as a SCF.)

d) The server obtains, or at least initiates an obtainment of, the additional information from a database 150 with a database query 145.

e) The server 140 acknowledges 335 to the IMS 310 that the additional information is obtained, or the process is at least initiated. This instructs the IMS to continue call connection procedure further. In some implementations the server 140 may be configured to deliver the acknowledgement 335 even before the database query 145 has been initiated in order to fasten the call setup.

f) The IMS 310 initiates routing the IP based call connection 355 to subscriber B.

g) Subscriber B 120 indicates a ringing state 356 in the call connection to IMS 310. The ringing state may also be indicated to subscriber A 110 by delivering an indication 365 from IMS 310 to MSC 200 and further to subscriber A with an indication 250.

h) Arrow 375 refers to an optional step for informing the server 140 on the ringing state. The step is advantageous if the delivery of additional information is desired to be linked a predefined state, such as ringing state, during the call connection setup.

i) The server 140 is configured to deliver the additional information 165 to subscriber B 120. Depending on the implementation this may happen directly in response to receipt of information from the database 150 or in response of receipt of information on the ringing state (step h).

j) In step 275 the call connection is setup between the subscriber A and the subscriber B if the call connection is accepted by subscriber B.

Figure 4:
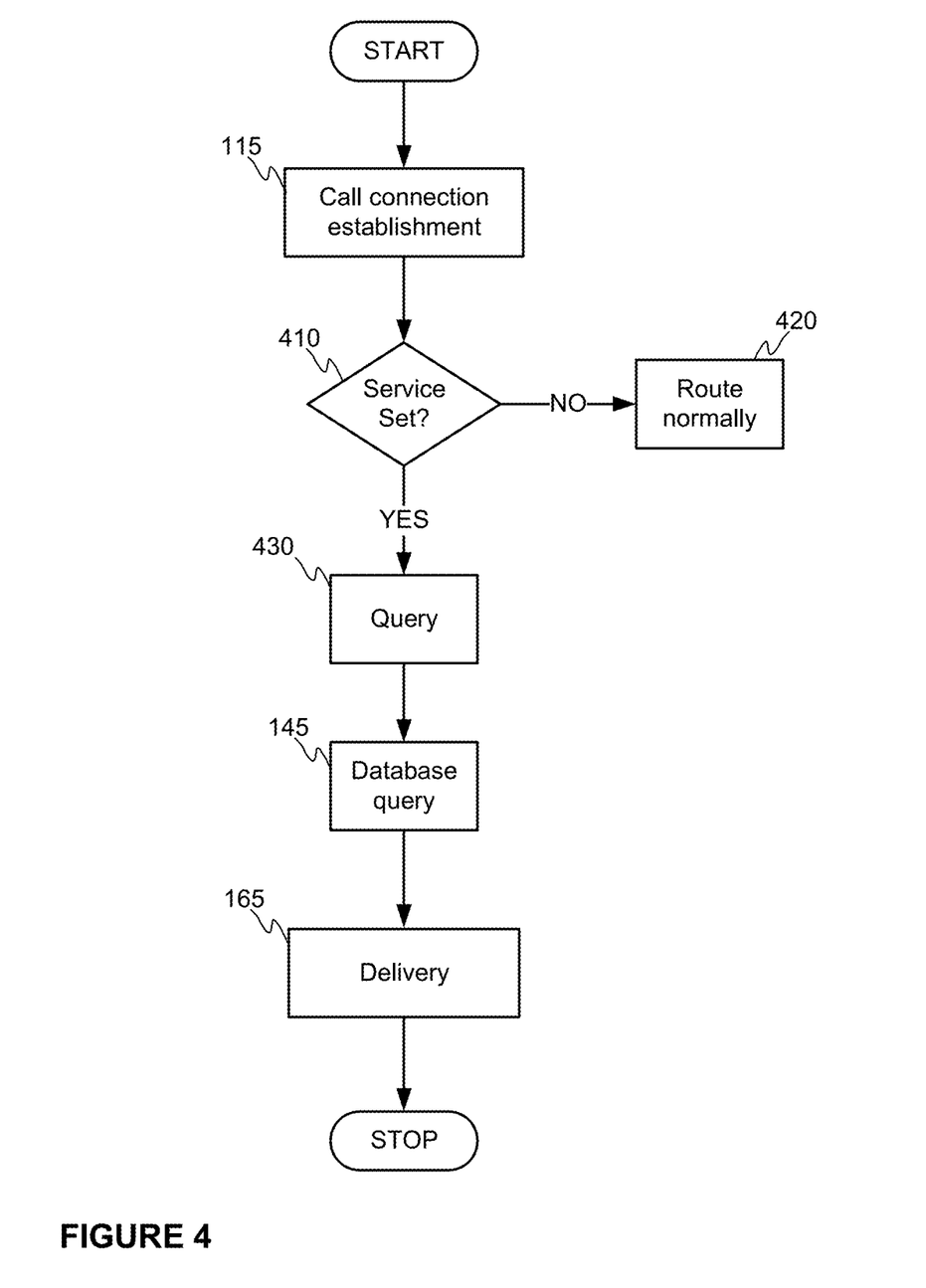
FIG. 4 illustrates schematically a flow chart of an embodiment of the invention.

FIG. 4 illustrates an example of the method according to the invention as a flow chart. The connection control unit receives a request for establishing a call connection 115 from a subscriber A. The connection control unit determines if a service for providing additional information on a caller (subscriber A) is set for the callee (subscriber B) 410. The connection control unit may determine the service setup from its own database or by utilizing any other entity, such as intelligent network. If the service is not set for the subscriber B, the call connection is routed normally 420. If the service is set for the subscriber B, the connection control unit is configured to initiate a query 430 towards a server. The query 135 carries the identity information of the subscriber A and the subscriber B to the server 140. The server 140 is configured to initiate a database query 145 by obtaining the identity information of the subscriber A from the query 135 and by attaching the obtained identity information to the database query 145. The server 140 receives at least part of the additional information stored in the database and is configured to deliver 165 it by means of some communication channel to the subscriber B.

Figure 5:
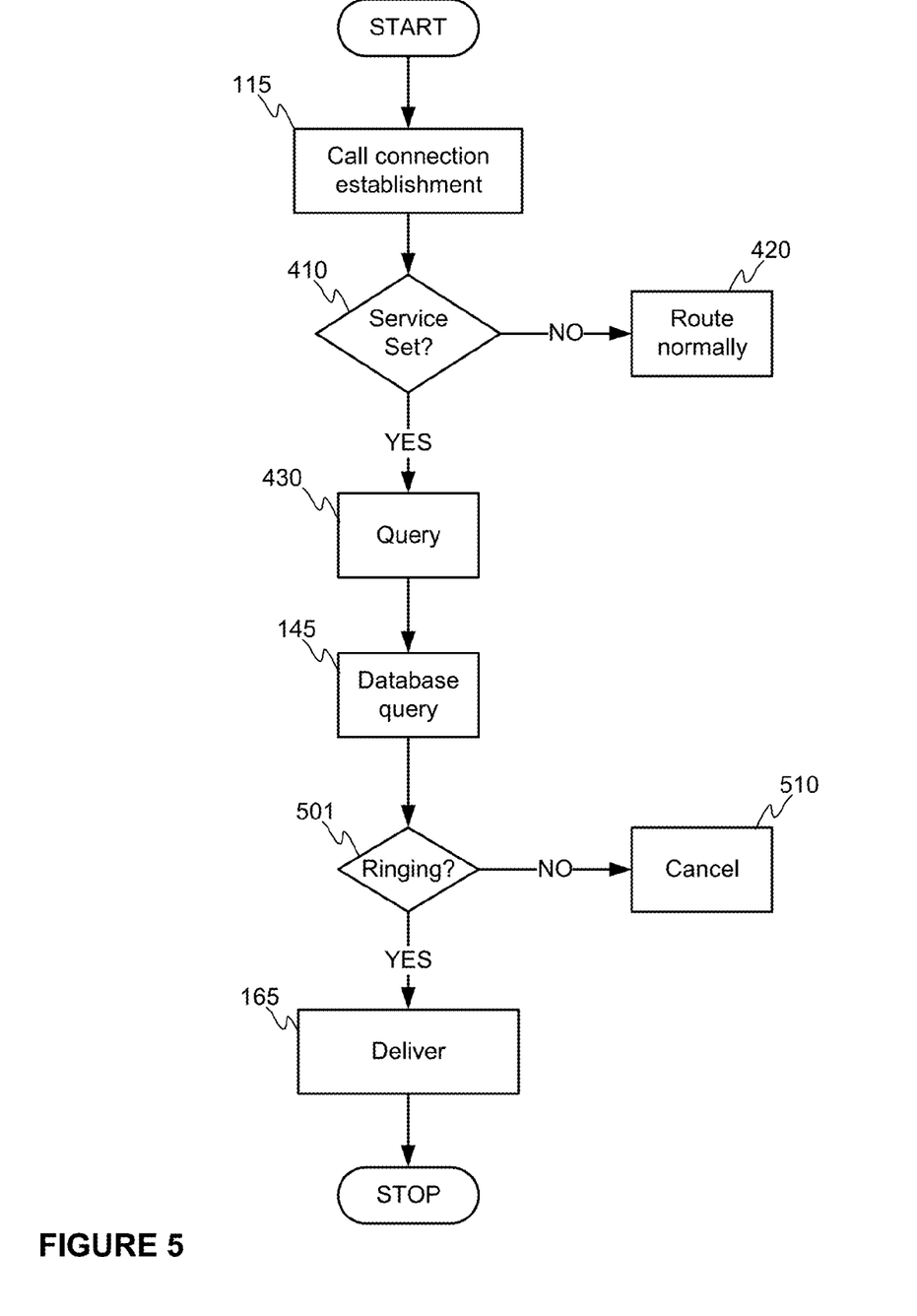
FIG. 5 illustrates schematically a flow chart of another embodiment of the invention.

FIG. 5 illustrates a further example of the method according to the invention in which some further aspects are disclosed. FIG. 5 illustrates a method which takes into account the state of a call setup prior to delivering the additional data 165. The steps in FIG. 5 are similar to steps in FIG. 4 until the database query 145. In response of receipt the additional information the server is configured to receive an indication on the state of the call connection establishment. More specifically, the server 140 receives information if the call setup is still in ringing state 501. If this is not the case, the server 140 could be configured to cancel the delivery of the additional information to the subscriber B 510 as the additional information may already be obsolete at that time. This makes the delivery of the additional information 165 to be performed as described, depending on the configuration, to happen only when the call setup is in ringing state.

As described the call connection and the additional information are delivered though different connections, or at least independently from each other. In order to provide a good user experience it may be arranged that the user equipment of the subscriber B is furnished with application software. The application software is executed by the user terminal and it is configured to monitor and receipt at least the additional information from the server. Additionally or in addition, it may be configured to provide control signals in order to bring the content of the additional information on the display of the user equipment preferably prior to call connection. The application software is advantageously configured so that it may detect, by means of any predetermined identifier, each piece of information received by the subscriber B in the user equipment by any communication technology, such as IP data, short message, MMS, or similar, which piece of information relate to provision of additional information on the subscriber A. Thus, the application software may output the received information on the display. In some implementation it could be arranged so that the information is delivered to the application software even before the ringing state if available and shown to the user only when the call connection establishment is in a ringing state. In other word the application software in the user equipment may be arranged to synchronize the visualization of the additional information at least partly dependently on the state of the call connection. The application software as such may be a downloaded application in the user equipment or native application, such as SMS application, in the user equipment.

Figure 6:
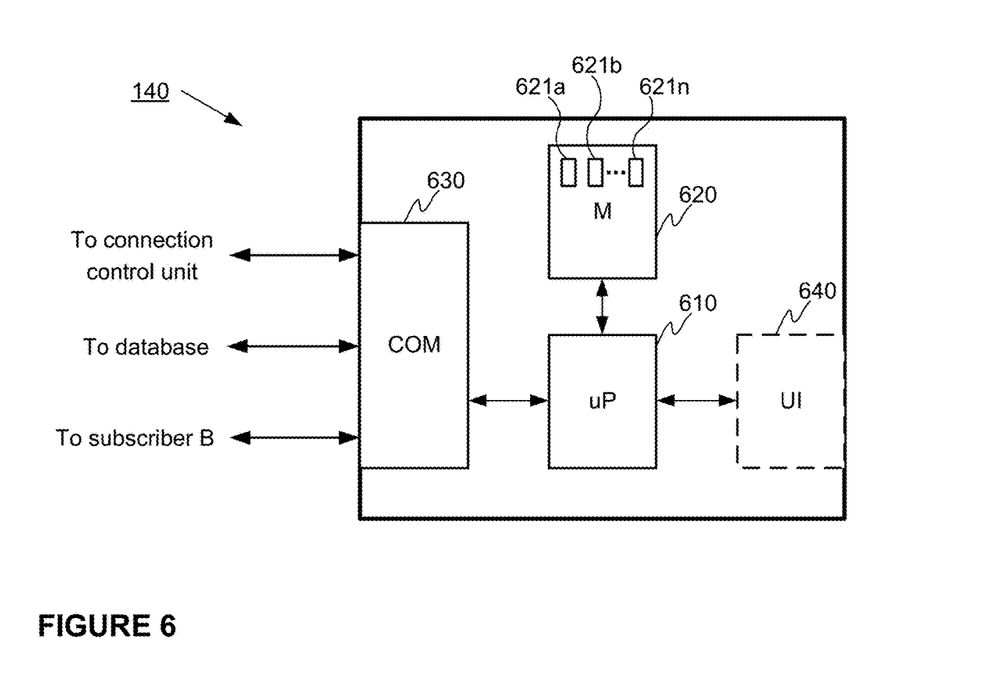
FIG. 6 illustrates schematically a server according to an embodiment of the invention.

FIG. 6 discloses an example of a server 140 according to the invention. The server 140 may comprise one or more processors 610, one or more memories 620 being volatile or non-volatile for storing portions of computer program code 621a-621n and any data values, a communication interface 630 and possibly one or more user interface units 640. The mentioned elements are communicatively coupled to each other with e.g. an internal bus. The communication interface provides interface for communication with any external unit, such as a connection control unit, database and subscribers. The communication interface may be based on one or more known communication technologies, either wired or wireless, in order to exchange pieces of information as described earlier.

The processor 610 of the server 140 is at least configured to implement the method as described. The implementation of the method may be achieved by arranging the processor 610 to execute at least some portion of computer program code 621a-621n stored in the memory 620 causing the processor 610, and thus the server 140, to implement one or more method steps as described. The processor 610 is thus arranged to access the memory 620 and retrieve and store any information therefrom and thereto. Moreover, the processor 610 is configured to control the communication through the communication interface 630 with any external unit, such as with the sensors. The processor 610 may also be configured to control the output of information, i.e. data. The processor 610 may also be configured to control storing of received and delivered information. For sake of clarity, the processor herein refers to any unit suitable for processing information and control the operation of the apparatus, among other tasks. The mentioned operations may e.g. be implemented with a microcontroller solution with embedded software. Similarly, the invention is not limited to a certain type of memory only, but any memory type suitable for storing the described pieces of information may be applied in the context of the present invention.

An example of the invention also relates to a non-transitory computer-readable storage medium, which stores at least portions of computer program code, wherein the portions of computer program code are computer-executable to implement the method steps in a server as described. In general, the computer-readable storage medium may include a storage medium or memory medium, such as magnetic or optical media e.g. disc, DVD/CD-ROM, volatile or non-volatile media, such as RAM. The computer program code may be written in any form of programming language, including compiled or interpreted languages, and the computer program may be deployed in any form, including as a stand-alone program or as a subroutine, element or other unit suitable for use in a computing environment. A computer program code may be deployed to be executed on one server or on multiple servers at one site or distributed across multiple sites and interconnected by a communication network.

In the previous examples it is mainly described an implementation of the invention in which the server 140 receives a query with MSISDN information on subscriber A and subscriber B when the service is activated for the subscriber B. The query instructs the server to acquire additional information on the subscriber A e.g. from a database. In some further embodiment the server 140 may deliver the parameters in the query to an external server which is configured to obtain, with a query established on its own, from a database and to deliver the obtained additional information on the subscriber A to a final destination, i.e. to a terminal of the subscriber B. Alternatively, the server 140 may be configured to obtain the additional information on the subscriber A, as described earlier, but to deliver the obtained information to an external server, which may be configured to manipulate the data and/or to deliver it to the subscriber B. The external server may e.g. reside in the same network as the first server 140, or in another network which is communicatively coupled to the network of the first server 140. In other words, the additional information may be delivered to the subscriber B either directly from the server 140 or indirectly through another external server. In the indirect implementation the other steps of the invention are applicable. However, it may be e.g. arranged that the acknowledgements to the call control unit by the server 140 as described above may be initiated from an received acknowledgement from the external server.

Some elements or entities belonging to mobile communication network or in any other network necessary for implementing the invention are not disclosed in the appended figures or in the description in order to maintain the clarity of the description. For example, the mobile communication network consists of a core network part and radio access network part. The radio access part is not disclosed at all herein and as regards to core network only some parts are included. Generally speaking only those elements are disclosed which have relevance in implementing the invention as described. Moreover, the term IN (Intelligent Network) shall be understood to cover the traditional intelligent network setup, but also so called Next Generation Intelligent Network (NGIN). So, the server 140 may be part of NGIN environment.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A method for providing information relating to a subscriber A in a call connection establishment initiated by the subscriber A to a subscriber B, the method comprising:
   receiving a call connection in a connection control unit,
   initiating, by the connection control unit, a query to a server, the query comprising identity information on the subscriber A and the subscriber B,
   obtaining information, by the server, relating to the subscriber A from a database,
   receiving, by the server, an indication on a state of the call connection establishment from the connection control unit, and
   providing, by the server, the obtained information relating to the subscriber A to the subscriber B by using the identity information on the subscriber B in response to a detection that the state of the call connection establishment matches to a predefined state.

2. The method of claim 1, wherein the method further comprising a step of acknowledging the connection control unit on at least one of the following: receipt of query in the server, obtainment of information from the database.

3. The method of claim 2, wherein the method further comprising a step of initiating the call connection, by the connection control unit, to subscriber B in response to the acknowledgement by the server.

4. The method of claim 3, wherein the indication is established in response to a receipt of information from the subscriber B by the connection control unit.

5. The method of claim 3, wherein the predefined state is a ringing state.

6. The method of claim 3, wherein the method further comprising a step of canceling the provision of the obtained information if the state of the call connection deviates from the predefined state.

7. The method of claim 1, wherein the provision of the obtained information relating to the subscriber A to the subscriber B by the server is performed either directly or indirectly through another server.

8. A system for providing information relating to a subscriber A in a call connection establishment initiated by the subscriber A to a subscriber B, the system comprising:
   a connection control unit configured to control the call connection establishment, and
   a server configured to obtain the information relating to the subscriber A in response to a query from the connection control unit and configured to deliver the obtained information to the subscriber B in response to a detection that the state of the call connection establishment matches to a predefined state.

9. The system of claim 8, wherein the system further comprising a database maintaining the information on the subscriber A.

10. The system of claim 8, wherein the obtainment of information relating to the subscriber A is based on identity information of subscriber A and subscriber B, wherein the identity information is carried in the system.

11. The system of claim 8, wherein the connection control unit is at least one of the following: mobile switching center, intelligent network, IP multimedia subsystem.

12. The system of claim 8, wherein the system further comprising an external server through which the server is configured to deliver the obtained information to the subscriber B.

13. A server for providing information relating to a subscriber A in a call connection establishment initiated by the subscriber A to a subscriber B, the server comprising
   at least one processor, and
   at least one memory storing at least one portion of computer program code,
   the processor being configured to cause the server at least to perform:
   receive a query from a connection control unit, the query comprising identity information on the subscriber A and the subscriber B,
   obtaining information relating to the subscriber A from a database,
   receiving an indication on a state of the call connection establishment from the connection control unit, and
   providing the obtained information relating to the subscriber A to the subscriber B by using the identity information on the subscriber B in response to a detection that the state of the call connection establishment matches to a predefined state.

14. The server of claim 13, wherein the server is further configured to acknowledge the connection control unit on at least one of the following: receipt of query, obtainment of information from the database.

15. The server of claim 13, wherein the server is further configured to cancel the provision of the obtained information if the indicated state of the call connection deviates from the predefined state.

16. The server of claim 13, wherein the server is configured to deliver the obtained information relating to the subscriber A to the subscriber B through an external server.

17. The method of claim 2, wherein the provision of the obtained information relating to the subscriber A to the subscriber B by the server is performed either directly or indirectly through another server.

18. The method of claim 3, wherein the provision of the obtained information relating to the subscriber A to the subscriber B by the server is performed either directly or indirectly through another server.

* * * * *